March 18, 1958

G. E. LYNN 2,827,570

STABILIZED MAGNETIC OSCILLATOR

Filed June 1, 1956

INVENTOR.
G. E. LYNN
BY Wade Koontz and
Martin J. Finnegan
ATTORNEYS

United States Patent Office 2,827,570

Patented Mar. 18, 1958

2,827,570

STABILIZED MAGNETIC OSCILLATOR

Gordon E. Lynn, Severna Park, Md., assignor, by mesne assignments, to the United States of America as represented by the Secretary of the Air Force Application June 1, 1956, Serial No. 588,935

3 Claims. (Cl. 250—36)

This invention relates to oscillators and more particularly to low frequency stabilized magnetic oscillators.

In an oscillator containing electron discharge tubes, one of the most important considerations is frequency stability. The frequency stability is affected adversely by many factors. In the said oscillator, which is directly generating a desired frequency, it is to be expected that frequency variations will occur because of temperature changes in the said electron discharge tubes and tube replacements.

Changes in plate and filament voltages acting on the said electron discharge tubes affect the frequency by influencing alternating currents flowing in the said oscillator. In addition, when the load impedance varies in the output circuit of the said oscillator, it is usually found that the frequency of the said oscillator is changed. Smooth shifting of frequency with variation in the said load impedance is referred to as frequency pulling, and sudden frequency changes are called frequency splitting. In many instances, buffer amplifiers are employed after the said oscillators to minimize the effect of variations of the said load impedance upon frequency.

The present invention provides a novel method and apparatus for producing stabilized oscillations of a selected frequency without the use of electron discharge tubes.

One object of this invention is to provide, in an oscillation generator, a novel arrangement of circuitry for sustaining oscillations by utilizing an inter-relationship of components in a manner to take advantage of the inherent characteristic of a capacitor to successively store and discharge electrical energy in repetitive cycles whose frequency can be adapted to follow a substantially constant pattern.

Another object of this invention is to provide a circuit for a magnetic oscillator whose frequency stability is largely independent of the frequency and magnitude of the actuating input power.

A further object of this invention is to provide a novel arrangement of circuitry adapted for coupling between a magnetic oscillator and a load in such manner that only minor frequency change results even during periods of substantial variation in load impedance.

A more complete understanding of the invention can be had from the following description of an illustrative embodiment thereof, when considered in connection with the accompanying drawing, wherein.

Figure 1:
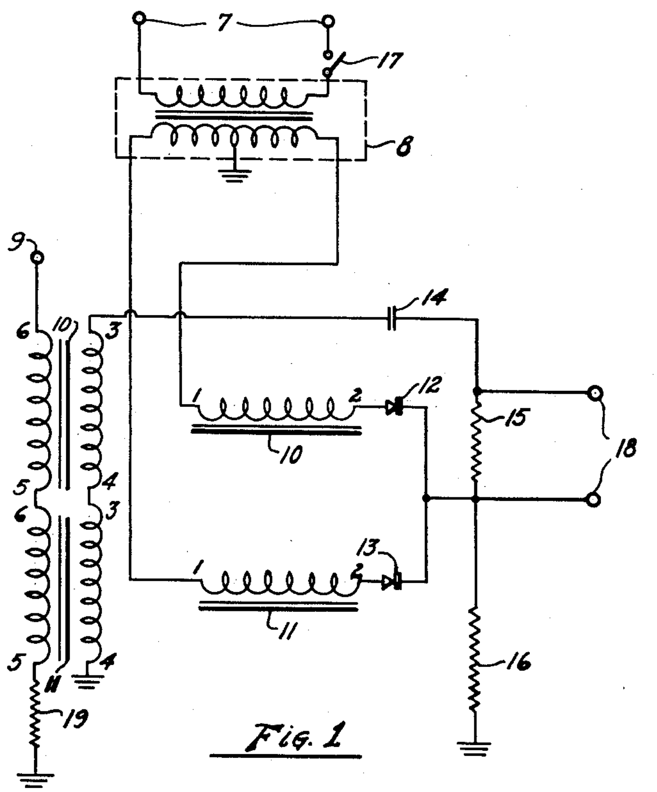
Fig. 1 is a diagram of a magnetic oscillator constituting a preferred embodiment of my invention.

In Fig. 1 terminals 7 are adapted to receive an actuating input power from an alternating current source.

The primary of transformer 8 receives the said actuating input power when switch 17 is closed. 10 and 11 are iron-cores, on each of which are three windings 1—2, 3—4, and 6—5. 1—2 represents the power winding which is supplied with an actuating input power from the center tapped secondary of transformer 8. 3—4 represents the feedback winding, and 6—5 the bias winding, the said bias winding 6—5 is connected through resistor 19. Terminal 9 is adapted to receive direct current energy which is utilized for bias purposes. The rectifiers 12 and 13 provide self-saturation of said iron-cores 10 and 11, respectively. 14 is the feedback capacitor and 15 is the feedback resistor. 16 represents the load resistor. Terminal 18 is adapted to furnish the load with the output power from the said magnetic oscillator.

Figure 2:
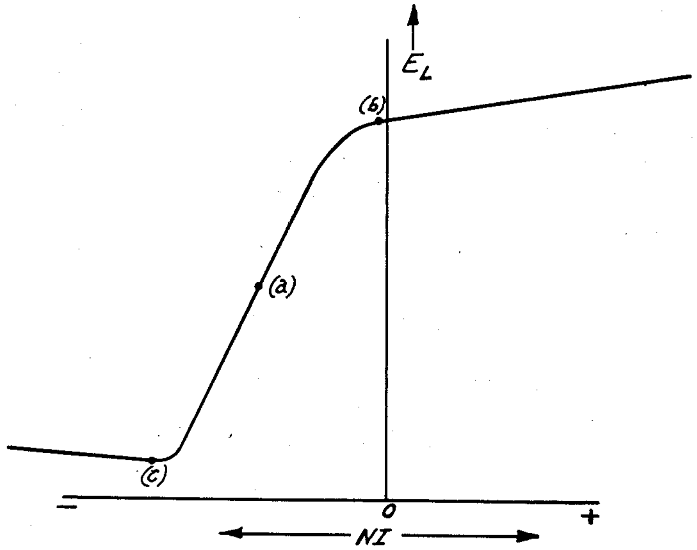
Fig. 2 is a typical transfer characteristic of the said magnetic oscillator.

Referring to Fig. 1, the circuit operates in the following manner. When switch 17 is open, the circuit is entirely deenergized except for the bias current which flows through bias windings 6—5 and establishes in iron-cores 10 and 11 a constant flux level opposite in polarity to that which would be induced by current flow through power windings 1—2. The charge on feedback capacitor 14 is zero. When switch 17 is closed, the circuit at first behaves like a normal center-tapped magnetic amplifier circuit, establishing a D. C. potential across the load resistor 16. Because of the bias current, the circuit would normally operate at point (*a*) on the transfer characteristic of Fig. 2 if the feedback circuit were open. Since the feedback circuit is closed, a charging current flows through feedback resistor 15, feedback capacitor 14 and feedback windings 3—4. This current in feedback windings 3—4 augments the flux level in iron-cores 10 and 11 induced by the flow of load current in power windings 1—2. This positive type feedback results, within a few cycles of power frequency, in operation at some point to the right of point (*b*) on transfer characteristic of Fig. 2. As the charge on feedback capacitor 14 increases, the charging current decreases. When the ampere turns developed by the flow of charging current through feedback windings 3—4 are not sufficient to sustain operation at the said point (*b*), the voltage $E_L$ across load resistor 16 begins to decrease toward the said point (*a*). This results in the discharge of feedback capacitor 14. The current resulting from the discharge of feedback capacitor 14 induces a flux of opposite polarity to that produced by flow of load current in power windings 1—2 and results in operation to the left of point (*c*) of Fig. 2. When the discharge current is no longer large enough to force operation at the said point (*c*), $E_L$ the voltage across load resistor 16, begins to increase toward point (*a*) on Fig. 2. Charging current begins to flow again, starting another cycle.

The frequency at which this sequence occurs is dependent largely on the values of feedback capacitor 14, feedback resistor 15, and the inductance of feedback windings 3—4. Changes in the value of load resistor 16 and the magnitude of frequency of the actuating input power have only a small effect on the frequency of the oscillation. Depending on the value of feedback resistor 15 chosen to produce a desired frequency of oscillation, the load impedance can be varied over wide limits without affecting the frequency stability.

While a preferred embodiment of my invention has been disclosed as an example, it is understood that various modifications, within the conception of those skilled in the art, are possible without departing from the spirit of my invention or the scope of the claims.

What I claim is:

1. Apparatus for producing electrical energy flow of substantially stable frequency which comprises a plural-winding magnetic amplifier, energy storing means in series relation to one of the windings of said amplifier, and co-operating therewith to achieve successive cycles of saturation, of a magnetic field, in alternate directions and means including unidirectional circuitry receiving the output of another of the windings of the said amplifier for facilitating the alternate storing and discharging of said energy storing means to thereby produce an energy output whose frequency peaks correspond to the time spacing of said storing and discharging sequences.

2. Apparatus as defined in claim 1, wherein said circuitry includes coupling means for stabilizing said output at a desired frequency.

3. Apparatus for producing electrical energy flow of substantially stable frequency which comprises a plural-winding magnetic amplifier, energy storing means in series relation to one of the windings of said amplifier and cooperating therewith to achieve successive cycles of saturation of a magnetic field in alternate directions, and means receiving the output of another of said windings and utilizing said output to synchronize the cyclic action of said energy storing means with that of said magnetic field to thereby produce an energy output having repetitive output peaks coincident with those of said saturation cycles.

References Cited in the file of this patent

UNITED STATES PATENTS

| | | |
|---|---|---|
| 1,654,932 | Heising | Jan. 3, 1928 |
| 2,611,890 | Walsh | Sept. 23, 1952 |
| 2,698,908 | Ford | Jan. 4, 1955 |